US012078200B2

(12) United States Patent
Ansalone et al.

(10) Patent No.: US 12,078,200 B2
(45) Date of Patent: Sep. 3, 2024

(54) FIXING SYSTEM FOR ROCKER ARMS

(71) Applicant: MASERATI S.p.A., Modena (IT)

(72) Inventors: Marco Ansalone, Mozzo (IT); Daniele Bruno, Soliera (IT); Maurizio Daniele, Ciampino (IT); Ettore Oliva, Modena (IT)

(*) Notice: Subject to any disclaimer, the term of this patent is extended or adjusted under 35 U.S.C. 154(b) by 244 days.

(21) Appl. No.: 17/808,457

(22) Filed: Jun. 23, 2022

(65) Prior Publication Data

US 2023/0012004 A1   Jan. 12, 2023

(30) Foreign Application Priority Data

Jun. 24, 2021   (IT) .................. 102021000016589

(51) Int. Cl.
 *F16B 39/04* (2006.01)
 *B60G 7/00* (2006.01)
 *B60G 7/02* (2006.01)
 *F16B 39/08* (2006.01)

(52) U.S. Cl.
 CPC .............. *F16B 39/04* (2013.01); *B60G 7/001* (2013.01); *B60G 7/02* (2013.01); *F16B 39/08* (2013.01); *B60G 2204/143* (2013.01)

(58) Field of Classification Search
 CPC ........ F16B 39/04; F16B 39/08; F16B 21/186; F16B 21/125; F16B 21/16; F16B 35/044; F16B 19/02; B60G 7/001; B60G 7/02; B60G 2204/143; B60G 7/00; B60G 13/00;

(Continued)

(56) References Cited

U.S. PATENT DOCUMENTS

| 1,167,690 | A | * | 1/1916 | Griffin | .................... F16B 39/04 |
| | | | | | 411/315 |
| 1,315,107 | A | * | 9/1919 | Fitzpatrick | .............. F16B 39/04 |
| | | | | | 411/945 |
| 1,599,189 | A | | 9/1926 | Smith | |

(Continued)

FOREIGN PATENT DOCUMENTS

| CN | 1820994 A | * | 8/2006 | ............. B60G 7/008 |
| CN | 104260781 A | * | 1/2015 | ............. B62D 17/00 |

(Continued)

OTHER PUBLICATIONS

Italian Search Report for IT Patent Application No. 102021000016589, Feb. 17, 2022, Munich, DE, 7 pages.

*Primary Examiner* — Drew J Brown
(74) *Attorney, Agent, or Firm* — Armstrong Teasdale LLP

(57) ABSTRACT

A fixing system for a rocker arm of a vehicle suspension has a threaded rod having a first thread, a second thread and a locking cavity. The fixing system has a first cam, integral for rotation with the threaded rod by shape-fitting coupling, a second cam integral for rotation with the threaded rod by shape-fitting coupling, a first nut, screwed onto the first thread to lock position of the first cam, and a second nut, screwed onto the second thread to lock position of the second cam and having a locking portion having a circumferential groove and a positioning hole passing through the circumferential groove. An elastic clip shaped as an open ring is accommodated in the circumferential groove for retaining a pin in the positioning hole. In a screwed position of the second nut, the pin fits into the locking cavity and locks the position of the second nut.

11 Claims, 4 Drawing Sheets

(58) Field of Classification Search
CPC .............. B60G 7/008; B60G 2204/42; B60G 2204/44; F16C 7/00; B62D 17/00
See application file for complete search history.

(56) References Cited

U.S. PATENT DOCUMENTS

| | | |
|---|---|---|
| 11,261,902 B2 * | 3/2022 | Adams .................... F16B 39/10 |
| 2010/0080666 A1 | 4/2010 | Dahl et al. |
| 2012/0224934 A1 | 9/2012 | Chang |

FOREIGN PATENT DOCUMENTS

| | | | | |
|---|---|---|---|---|
| CN | 106494168 A | * | 3/2017 | .............. B60G 7/00 |
| CN | 114542569 A | * | 5/2022 | |
| DE | 102014116077 A1 | * | 5/2016 | .............. B60G 3/02 |
| KR | 200374753 Y1 | * | 2/2005 | |
| KR | 20060070011 A | * | 6/2006 | |
| WO | WO-2018104120 A1 | * | 6/2018 | ............. B60G 7/001 |
| WO | 2019/116433 A1 | | 6/2019 | |

\* cited by examiner

FIXING SYSTEM FOR ROCKER ARMS

CROSS-REFERENCE TO RELATED APPLICATION

This application claims priority to Italian Patent Application No. 102021000016589, filed on Jun. 24, 2021, the contents of which are incorporated by reference in their entirety.

FIELD OF THE INVENTION

The present invention relates to a fixing system for fixing a rocker arm of a suspension to a chassis of a vehicle in an adjustable manner.

BACKGROUND OF THE INVENTION

Generally, fixing a rocker arm of a suspension to the mechanical chassis of a vehicle is accomplished through the use of a screw/cam assembly for adjusting the toe-in and camber angles of the suspension. The adjustment may be carried out transversely to the direction of travel of the vehicle, through a rotation of the screw and making use of the thrust of the cams on the shoulders of the seats of the mechanical chassis. On conventional vehicles powered by a combustion engine, attaching the rocker arm involves inserting the screw from the front of the vehicle towards the rear direction. Then, the assembly is completed by inserting a second cam, which is coupled to a groove suitably arranged on the shank of the screw, and a hexagonal nut that locks the position of the cam on the screw. In the context of all-electric powered vehicles, typically the space for rear attachment of the rocker arm of the suspension to the mechanical chassis is reduced because of the larger footprint due to the electric power train, and this prevents the use of a conventional screw/cam assembly similar to that used in vehicles powered by an internal combustion engine. In general, in fact, all locking systems of a nut on a screw or on a threaded shank involve the insertion of cotter pins, circlips, spring clips or equivalent components, which require adequate space for their correct positioning, assembly, and fixing. There is a need, therefore, to provide a fixing system that is small in size and easy to use, requiring no tools for either tacking or locking.

SUMMARY OF THE INVENTION

It is the object of the present invention to provide a fixing system for fixing a rocker arm of a suspension to a vehicle chassis in an adjustable manner which does not have the disadvantages of the prior art, and which is easily mounted and locked even in the absence of large working spaces.

This and other objects are fully achieved according to the present invention by a fixing system as described and claimed herein.

Advantageous embodiments of the fixing system according to the present invention are also described.

In summary, the present invention is based on the idea of providing a fixing system for fixing a suspension rocker arm to a vehicle chassis in an adjustable manner, the fixing system comprising:

a threaded rod, extending along a longitudinal direction thereof between a first end and a second end, opposite the first end, wherein the rod has a first thread at the first end and a second thread at the second end, and wherein the rod also has a locking cavity at the second end;

a first cam arranged integral for rotation with the rod by shape-fitting coupling with the rod at the first end;

a second cam arranged integral for rotation with the rod by shape-fitting coupling with the rod at the second end;

a first nut, screwed onto the first thread of the rod to lock the position of the first cam in the longitudinal direction; and a second nut, screwed onto the second thread of the rod to lock the position of the second cam in the longitudinal direction, wherein the second nut has a locking portion comprising a circumferential groove, and a positioning hole, formed through the circumferential groove;

the fixing system further comprising a pin and an elastic clip shaped as an open ring, the elastic clip being housed in the groove of the second nut so as to hold the pin in the positioning hole, wherein, at a predetermined longitudinal screwing position of the second nut onto the second thread of the rod, the pin engages in the locking cavity of the rod so as to lock the position of the second nut on the rod in the longitudinal direction.

By virtue of such a configuration of the fixing system, and in particular of the pin and elastic clip associated with the second nut, it is possible to proceed with tacking and locking, as well as with adjusting the toe-in and camber angles of the suspension, in an easy, quick and economical way, even when maneuvering space is limited, as for example in the context of a fully electric vehicle.

Preferably, the locking cavity is made in the form of a hole extending in a transverse direction, essentially orthogonal to the longitudinal direction, or in the form of a circumferential groove.

Advantageously, the pin is kept inserted in the positioning hole and in the locking cavity by the elastic clip, i.e., by the springback force that the elastic clip exerts on the pin. Preferably, the rod has a first groove at the first end for coupling by shape-fitting with the first cam and a second groove at the second end for coupling by shape-fitting with the second cam. Preferably, the second nut has an internal cavity that has an internal thread adapted for being screwed with the second thread of the rod, and wherein the positioning hole of the second nut extends from the outer surface of the nut to the internal cavity.

In a preferred embodiment of the present invention, the pin and the elastic clip are made as one piece. In an even more preferred embodiment of the present invention, the pin has a pin groove and the elastic clip has a clip hole, and the pin is made integral with the elastic clip by interlocking coupling of the clip hole into the pin groove.

Advantageously, a rod portion comprised between the locking cavity and the second end of the rod has a frusto-conical shape tapering from the locking cavity in the direction of the second end. Even more advantageously, in such a case, the elastic stiffness of the elastic clip is a function of the tapering angle of the rod portion comprised between the locking cavity and the second end of the rod. Lastly, the second nut may have a gripping portion adapted to allow adjustment of the screwing of the second nut onto the rod by a screwing tool.

BRIEF DESCRIPTION OF THE FIGURES

Further features and advantages of the present invention will be clarified by the following detailed description, given purely by way of non-limiting example in reference to the appended drawings, wherein.

DETAILED DESCRIPTION

Figure 1:
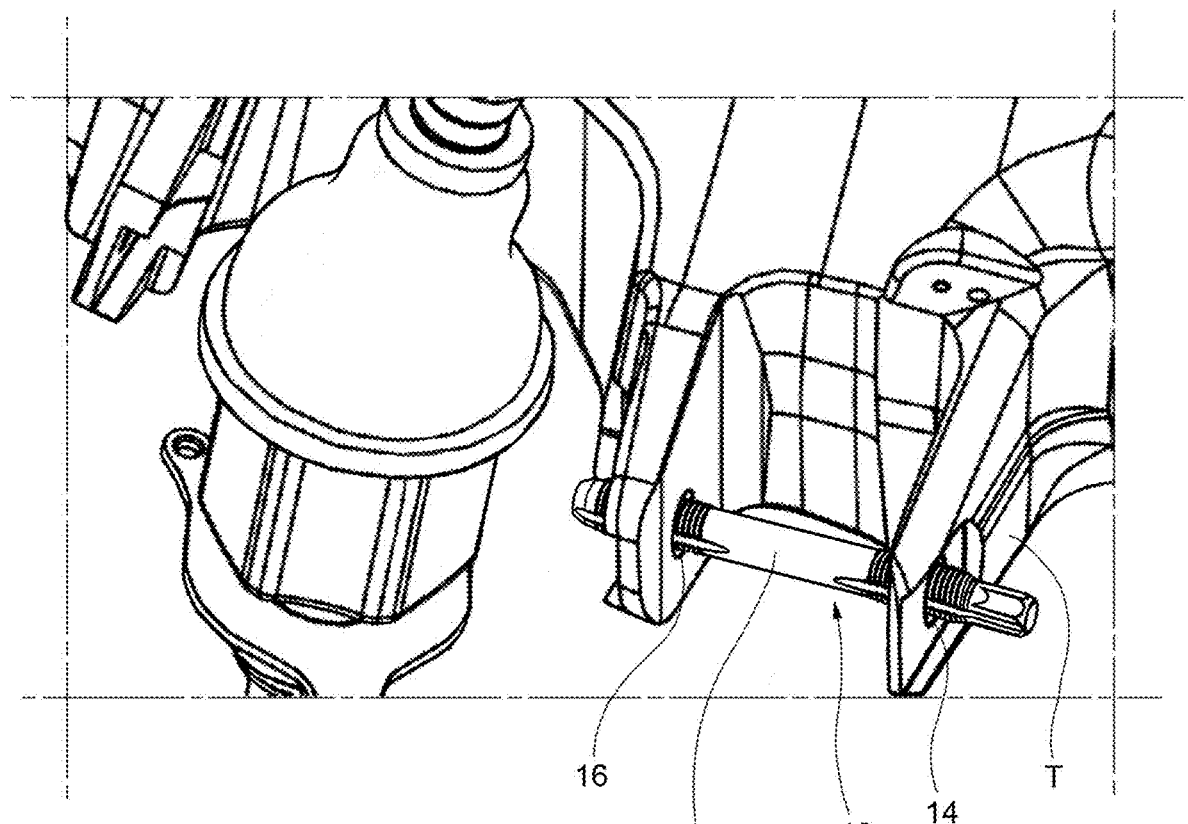
FIG. 1 is an axonometric view of a fixing system according to an embodiment of the present invention in the context of a vehicle chassis, wherein certain components are omitted for clarity.
Figure 2:
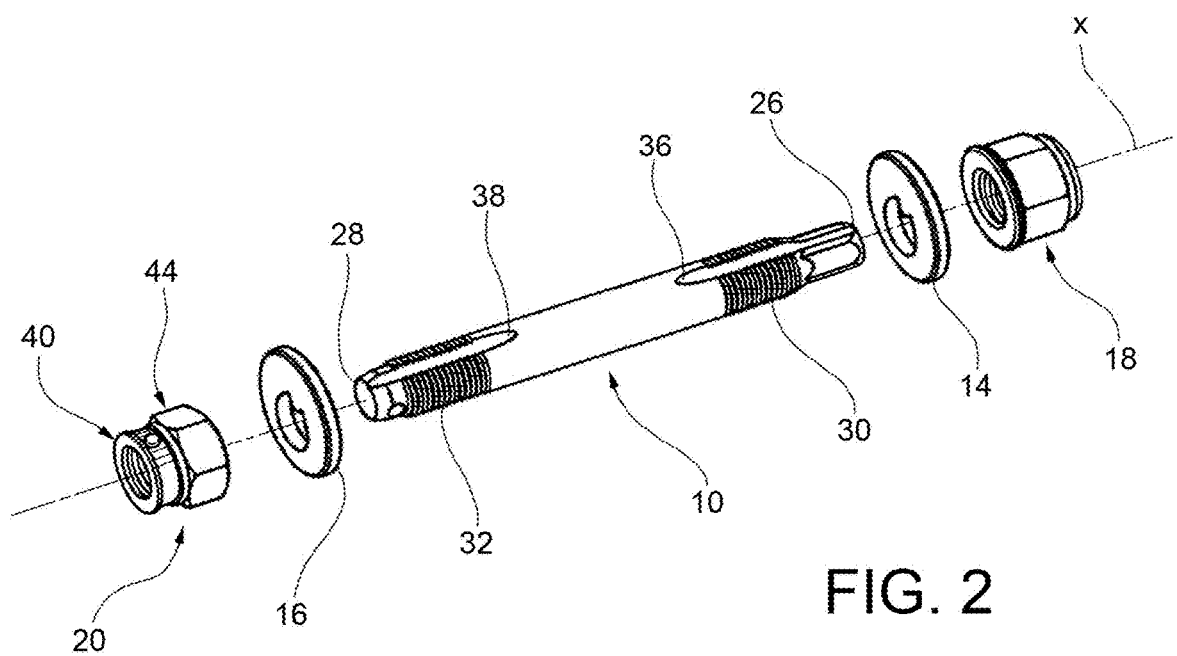
FIG. 2 is an exploded view of the fixing system of FIG. 1.
Figure 3:
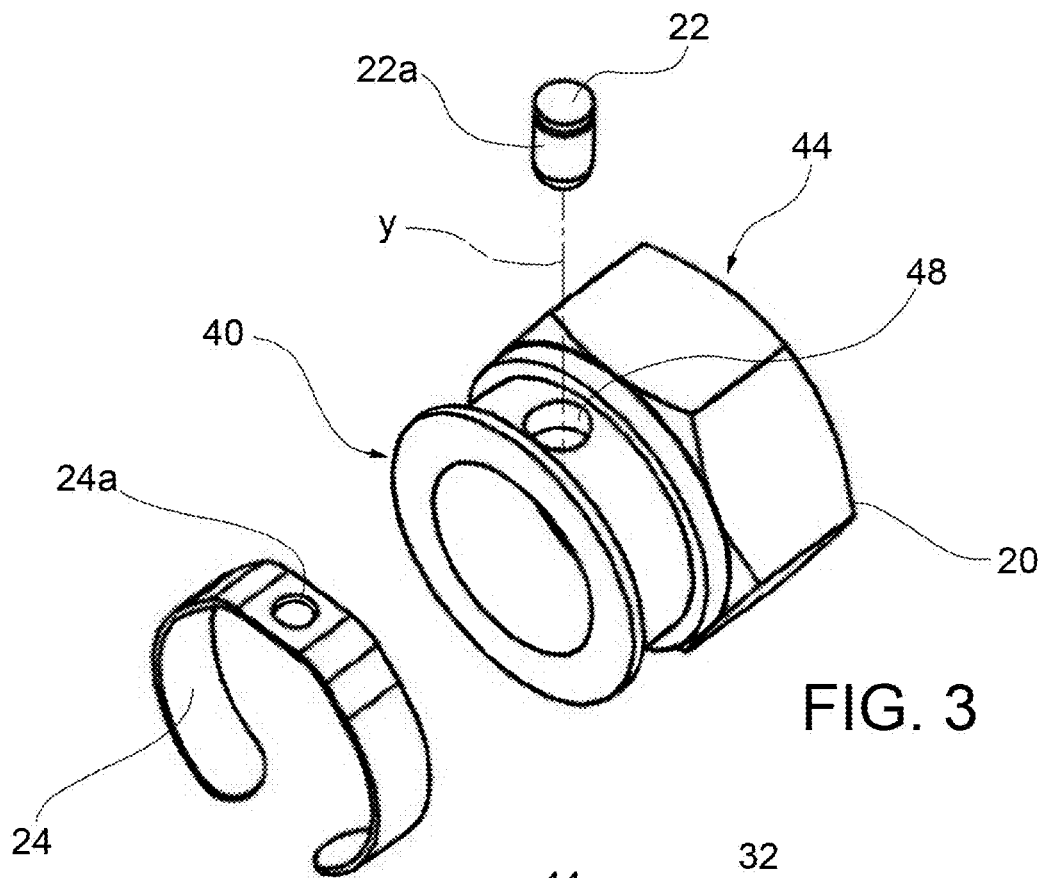
FIG. 3 is an exploded detail view of a part of the fixing system in FIG. 1.

With reference to the figures, the fixing system according to the present invention is indicated generally with 10.

The fixing system 10 is particularly suitable for fixing a rocker arm of a suspension to a chassis T of a vehicle in an adjustable manner, but it may also be used in different contexts where there is limited space for manoeuvring for adjusting screwing.

The fixing system 10 comprises a threaded rod 12, a first cam 14, a second cam 16, a first nut 18, a second nut 20, a pin 22, and an elastic clip 24. The rod 12 extends along an extension direction, or longitudinal direction x, between a first end 26 and a second end 28, opposite the first end 26. A first thread 30, at the first end 26, and a second thread 32, at the second end 28, are made on the outer surface of the rod 12. For example, in an illustrative and per se non-limiting manner, the first thread 30 extends between the first and fourth tenths of the overall length of the rod 12 in the longitudinal direction x, and the second thread 32 extends between the sixth and ninth tenths of the overall length of the rod 12 in the longitudinal direction x. The rod 12 has a further locking cavity 34, arranged at or near the second end 28. For example, in an illustrative and per se non-limiting manner, the locking cavity 34 is arranged a few millimeters from the second end 28. The locking cavity 34 may be provided as a through or blind hole (not necessarily circular in cross-section) extending in a transverse direction y, essentially orthogonal to the longitudinal direction x, as seen in FIGS. 4a through 4e. Alternatively, the locking cavity 34 may be made in the form of a circumferential groove. In an inherently obvious manner, the locking cavity 34 may be made in other equivalent shapes. In a particularly advantageous embodiment of the present invention, a rod portion 12a, comprised between the locking cavity 34 and the second end 28 of the rod 12, has a frustoconical shape. In particular, the rod portion 12a is tapered in the longitudinally outward direction, or the diameter of its cross-section in the transverse direction y decreases linearly from the locking cavity 34 to the second end 28 of the rod.

As previously mentioned, the fixing system 10 comprises a first cam 14 and a second cam 16. The first cam 14 and the second cam 16 are arranged integral for rotation with the rod 12 by means of a shape-fitting coupling arranged, respectively, at the first end 26 of the rod 12 and at the second end 28 of the rod 12, so that a rotation of the rod 12 corresponds to a similar rotation of the first cam 14 and the second cam 16. In a manner known per se, the angular positions of the first cam 14 and the second cam 16 are associated with the toe-in and camber angles of the suspension, so that by rotating the rod 12, the toe-in and camber angles may be changed and adjusted on command. In a particularly preferred embodiment, the rod 12 has a first groove 36 at the first end 26 for shape-fitting coupling with the first cam 14 and a second groove 38 at the second end 28 for shape-fitting coupling with the second cam 16.

The first nut 18, in a manner known per se, is screwed onto the first thread 30, externally with respect to the first cam 14, so as to lock its movement along the longitudinal direction x.

Similarly, the second nut 20 is screwed onto the second thread 32, externally with respect to the second cam 16, so as to block its movement along the longitudinal direction x. For this purpose, the second nut 20 has an internal thread 42 adapted to be screwed onto the second thread 32 of the rod 12. The second nut 20 has a locking portion 40 and a gripping portion 44, the gripping portion being adapted to facilitate the adjustment of the screwing of the second nut 20 onto the second thread 32 of the rod 12 by means of a conventional screwing tool, thus facilitating the grip of the second nut 20. The locking portion 40 in turn comprises a groove 46 and a positioning hole 48. The groove 46 is made externally and extends circumferentially. The positioning hole 48 is formed through the groove 46. Preferably, as shown in the figures, the second nut 20 has an internal cavity 50 along which the internal thread 42 is made, and the positioning hole 48 extends from the outer surface of the second nut 20 to the internal cavity 50.

As previously mentioned, in order to enable solid connection between the rod 12 and the second nut 20, the fixing system 10 further comprises the pin 22 and the elastic clip 24. According to an embodiment of the present invention, the pin 22 and the elastic clip 24 may be made as one piece, or integrally. According to another embodiment of the present invention (shown in the figures), the pin 22 and the elastic clip 24 are made separately but are adapted to be connected to each other so as to move integrally. For example, the pin 22 has a circumferential pin groove 22a and the elastic clip 24 has a clip hole 24a, so that the pin 22 is held integral with the elastic clip 24 by interlocking coupling of the pin groove 22a into the clip hole 24a. The elastic clip 24 constitutes a retaining element that serves to keep the pin 22 integral with the second nut 20 and elastically biased toward the inside of the second nut 20.

According to the present invention, the elastic clip 24 is constructed in the form of an open ring and is adapted to be housed in the groove 46 of the second nut 20, so as to exert a springback force sufficient to keep the pin 22 integral with the second nut 20 and positioned in the positioning hole 48. Due to this configuration, when the second nut 20 is screwed onto the second thread 32 of the rod 12, it reaches a predetermined longitudinal screwing position in which the pin 22 fits into the locking cavity 34 of the rod 12. In this way, the position of the second nut 20 on the rod 12 in the longitudinal direction x is locked.

As previously mentioned, the rod portion 12a is preferably tapered with a frustoconical shape toward the second end 28. In such a case, the elastic stiffness of the elastic clip 24 is advantageously chosen as a function of the value of the tapering angle of the rod portion 12a comprised between the locking cavity 34 and the second end 28 of the rod 12.

Figure 4A:
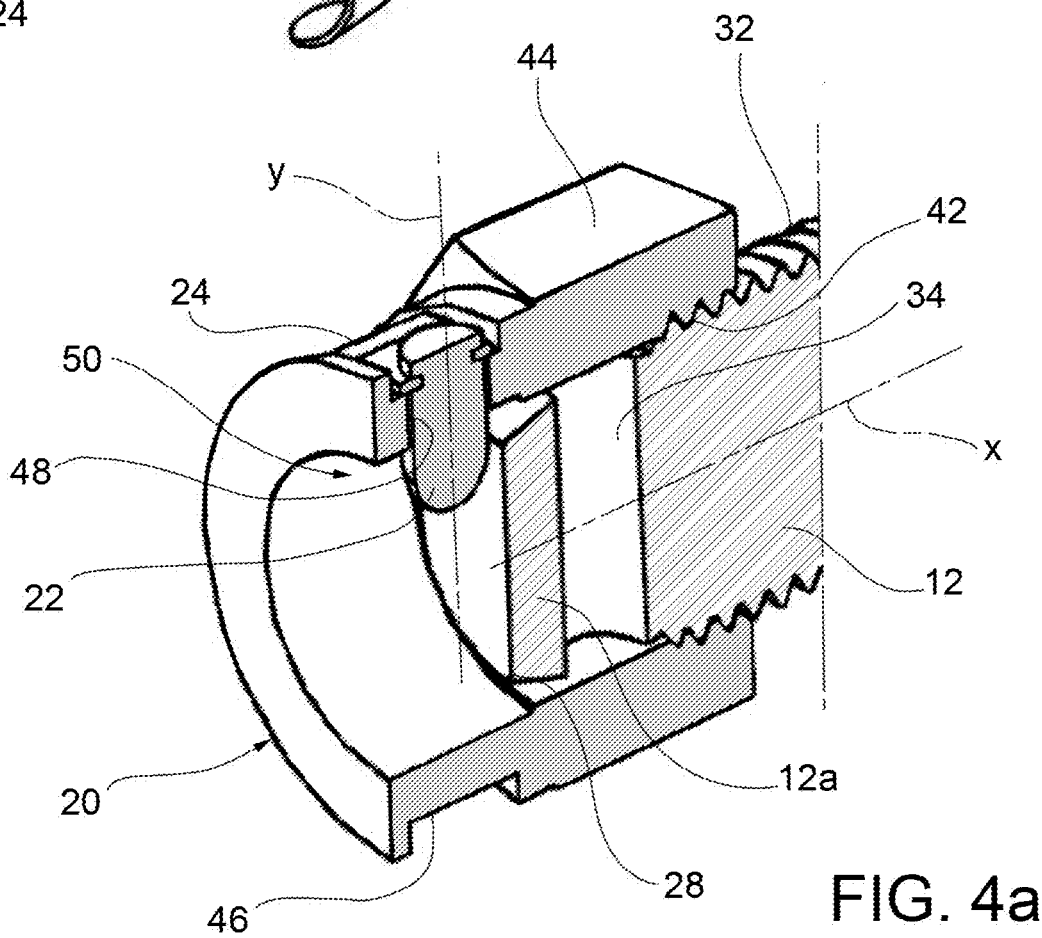
FIGS. 4a to 4e represent a detail view of a part of the fixing system at five consecutive moments of the screwing of the second nut on the second thread of the rod.
Figure 4B:
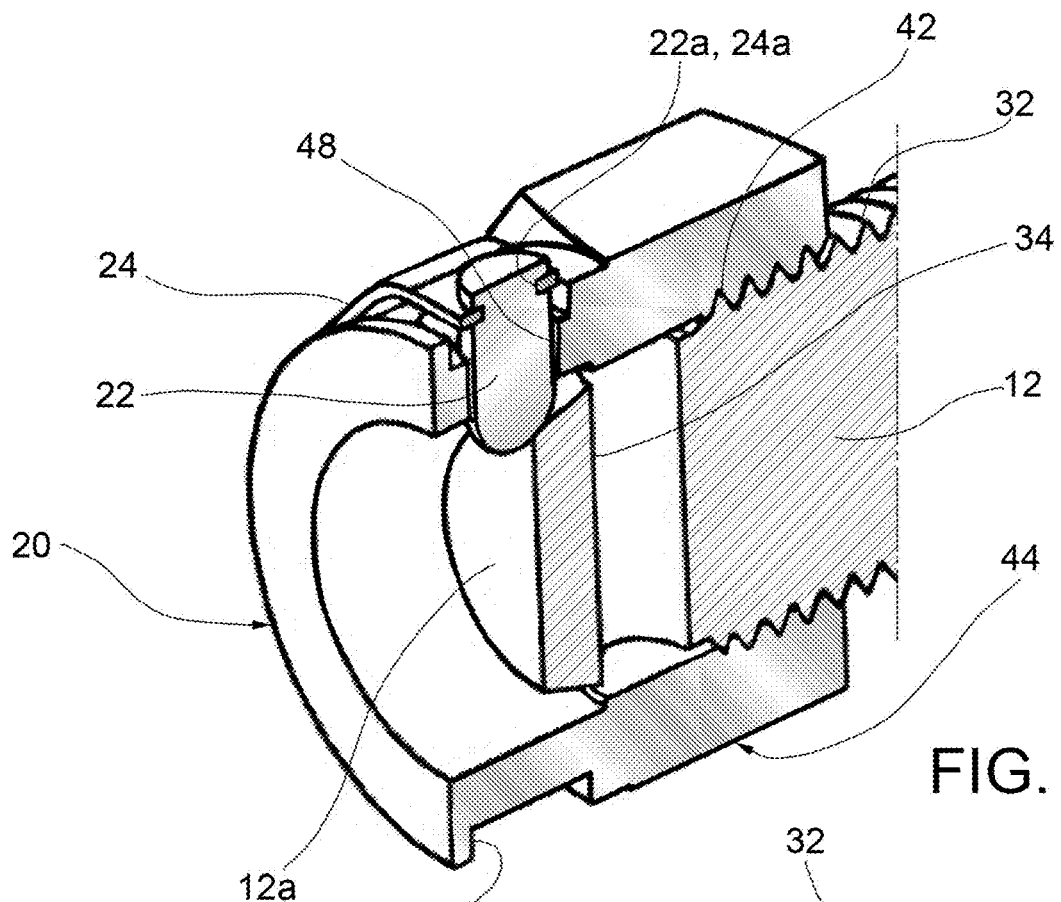
Figure 4C:
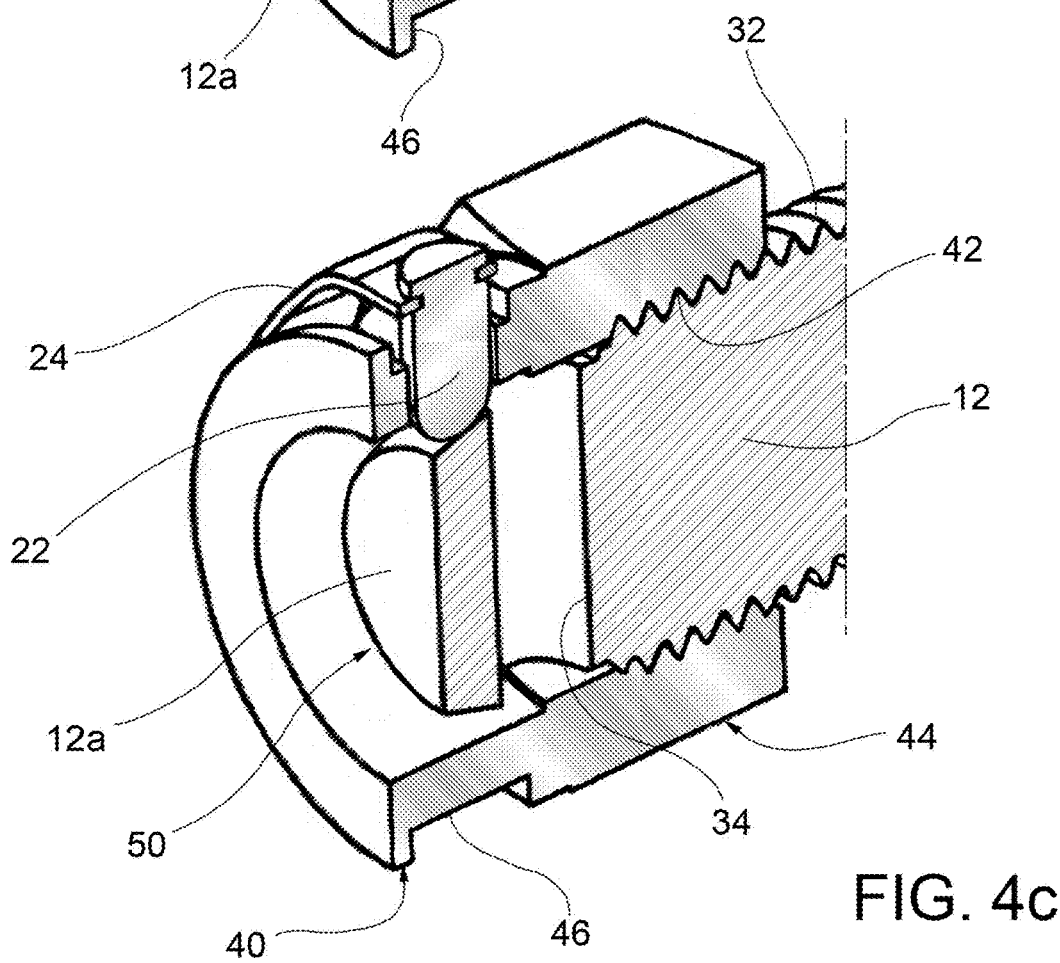
Figure 4D:
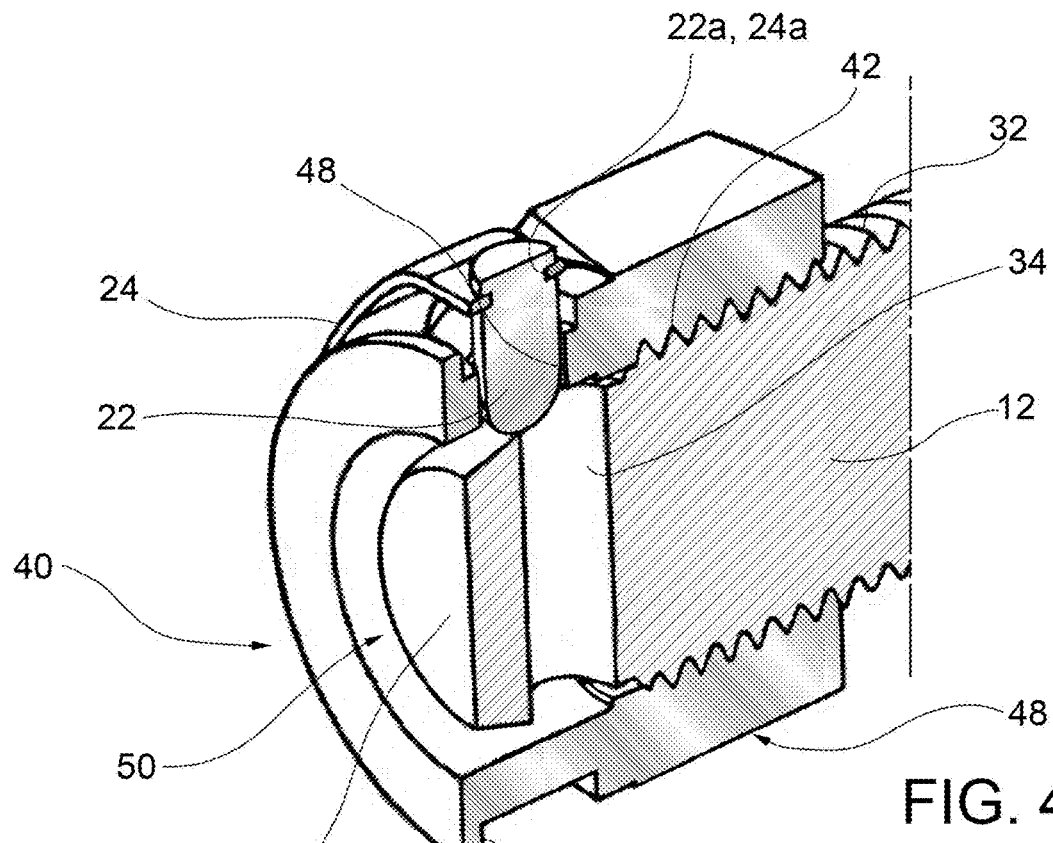
Figure 4E:
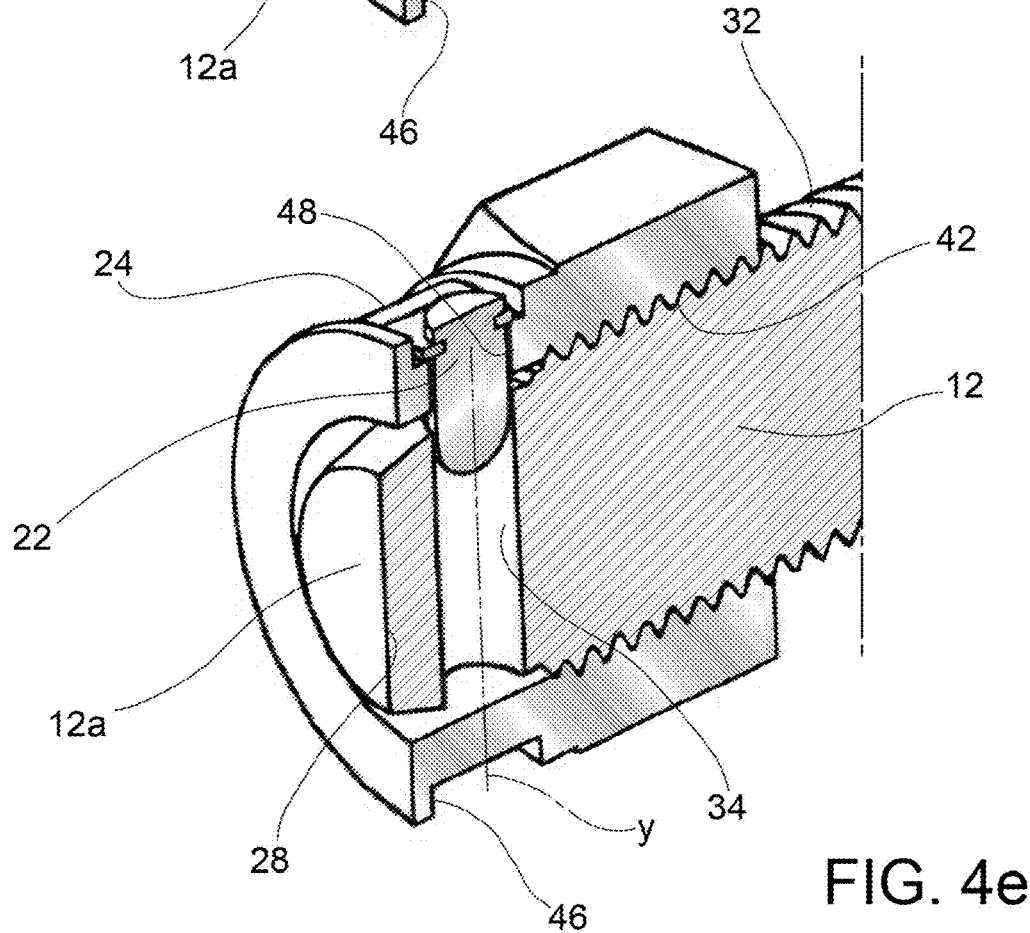

In particular, the screwing procedure may be seen in the succession of FIGS. 4a to 4e. When an operator begins to screw the second nut 20 onto the second thread 32 of the rod 12, the pin 22 is positioned as in FIG. 4a, or it is not in contact with the rod 12. As the screwing continues, the position in the longitudinal direction x of the second nut 20 changes and the pin 22 comes into contact with the rod 12, and in particular comes into contact with the rod portion 12a tapered with a frustoconical shape inclined toward the second end 28. As a result, as shown in FIGS. 4b and 4c, the pin 22, while remaining in the positioning hole 48, moves in an axial direction partially emerging out of the hole. As screwing continues, the position in the longitudinal direction x of the second nut 20 changes and the pin 22 arrives (FIG. 4d and FIG. 4e) in the position of the locking cavity 34. At this point, the springback force exerted by the elastic clip 24 on the pin 22 pushes the pin into the locking cavity 34 and, in so doing, locks the position of the second nut 20 on the rod 12 in the longitudinal direction x.

As is clear from the foregoing description, the present invention is readily applicable to a vehicle comprising a chassis T and a rocker arm adapted to connect a suspension to the chassis T of the vehicle. In such an application, it is sufficient to mount the fixing system 10 according to the present invention so that the first cam 14 and the second cam 16 are arranged so that the position of the rocker arm is adjustable according to the angular position of the first cam 14 and the second cam 16. At this point, the angular position of the rod 12 need only be adjusted, and, with it, the first cam 14 and the second cam 16, to adjust the toe-in and camber angles of the suspension of the vehicle.

As is readily apparent from the foregoing description, the fixing system according to the present invention enables the objects of the invention to be achieved.

In particular, by virtue of the easy-to-use configuration of the fixing system, it is possible to adjust the angular position of the rod and lock it in place even when the working spaces are very small, as in the case of a vehicle with an at least partially electric power supply.

Of course, without prejudice to the principle of the invention, embodiments and details of construction may vary widely with respect to those described and illustrated purely by way of non-limiting example, without thereby departing from the scope of protection as described and claimed herein.

What is claimed is:

1. A fixing system for fixing a rocker arm of a suspension to a chassis of a vehicle in an adjustable manner, the fixing system comprising:
    a threaded rod, extending along a longitudinal direction (x) between a first end and a second end, opposed to the first end, wherein the threaded rod has a first thread at the first end and a second thread at the second end, and wherein the threaded rod further has a locking cavity, at the second end;
    a first cam arranged integral for rotation with the threaded rod by shape-fitting coupling with the threaded rod at the first end;
    a second cam arranged integral for rotation with the threaded rod by shape-fitting coupling with the threaded rod at the second end;
    a first nut, screwed on the first thread of the threaded rod to lock a position of the first cam along the longitudinal direction (x); and
    a second nut, screwed on the second thread of the threaded rod to lock a position of the second cam along the longitudinal direction (x), wherein the second nut has a locking portion that comprises a circumferential groove, and a positioning hole, passing through the circumferential groove;
    the fixing system further comprising a pin and an elastic clip, the elastic clip being shaped as an open ring and configured to be accommodated in the circumferential groove of the second nut to hold the pin in the positioning hole, wherein, in a predetermined screwing position of the second nut on the second thread of the threaded rod, the pin enters the locking cavity of the threaded rod so as to lock a position of the second nut on the threaded rod along the longitudinal direction (x).

2. The fixing system of claim 1, wherein the locking cavity is shaped as a hole extending in a transversal direction (y), orthogonal to the longitudinal direction (x), or is shaped as a circumferential groove.

3. The fixing system of claim 1, wherein the pin is held in the positioning hole and in the locking cavity by a springback force generated by the elastic clip.

4. The fixing system of claim 1, wherein the threaded rod has a first groove at the first end for shape-fitting coupling with the first cam and a second groove at the second end for shape-fitting coupling with the second cam.

5. The fixing system of claim 1, wherein the second nut has an internal cavity having an internal thread configured to be screwed with the second thread of the threaded rod, and wherein the positioning hole of the second nut extends from an outer surface of the second nut up to the internal cavity of the second nut.

6. The fixing system of claim 1, wherein the pin and the elastic clip are made in one piece.

7. The fixing system of claim 1, wherein the pin has a pin groove and the elastic clip has a clip hole, and wherein the pin is integral to the elastic clip by interlocking coupling of the clip hole and the pin groove.

8. The fixing system of claim 1, wherein a rod portion comprised between the locking cavity and the second end of the threaded rod has a frustoconical shape that tapers from the locking cavity towards the second end.

9. The fixing system of claim 8, wherein elastic stiffness of the elastic clip is a function of a tapering angle of the rod portion comprised between the locking cavity and the second end of the threaded rod.

10. The fixing system of claim 1, wherein the second nut has a gripping portion configured to allow adjustment of the screwing of the second nut on the threaded rod by a screwing tool.

11. A vehicle comprising a chassis, a rocker arm configured to connect a suspension to the chassis of the vehicle, and a fixing system for fixing a rocker arm of a suspension to a chassis of a vehicle in an adjustable manner, the fixing system comprising:
    a threaded rod, extending along a longitudinal direction (x) between a first end and a second end, opposed to the first end, wherein the threaded rod has a first thread at the first end and a second thread at the second end, and wherein the threaded rod further has a locking cavity, at the second end;
    a first cam arranged integral for rotation with the threaded rod by shape-fitting coupling with the threaded rod at the first end;
    a second cam arranged integral for rotation with the threaded rod by shape-fitting coupling with the threaded rod at the second end;
    a first nut, screwed on the first thread of the threaded rod to lock a position of the first cam along the longitudinal direction (x); and
    a second nut, screwed on the second thread of the threaded rod to lock a position of the second cam along the longitudinal direction (x), wherein the second nut has a locking portion that comprises a circumferential groove, and a positioning hole, passing through the circumferential groove;
    the fixing system further comprising a pin and an elastic clip, the elastic clip being shaped as an open ring and configured to be accommodated in the circumferential groove of the second nut to hold the pin in the positioning hole, wherein, in a predetermined screwing position of the second nut on the second thread of the threaded rod, the pin enters the locking cavity of the threaded rod so as to lock a position of the second nut on the threaded rod along the longitudinal direction (x), wherein the first cam and the second cam are arranged so that position of the rocker arm is adjustable as a function of an angular position of the first cam and of the second cam.

* * * * *